F. KOCH.
WEIGHING MACHINE.
APPLICATION FILED DEC. 13, 1910.
1,033,420.
Patented July 23, 1912.
Fig. 1.
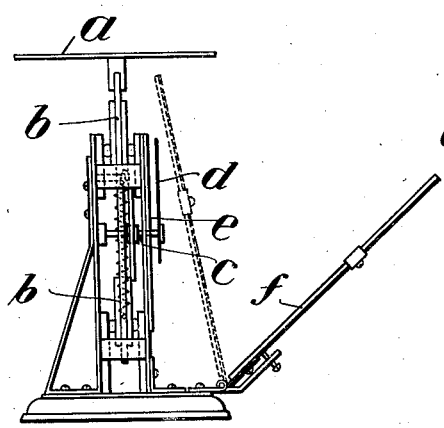
Fig. 2.
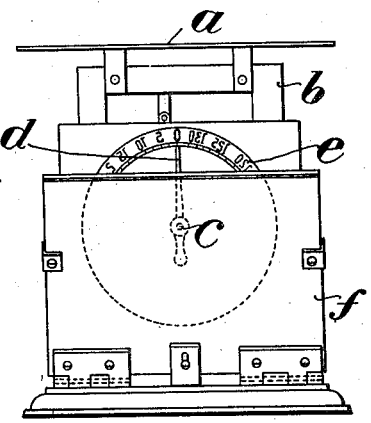
Fig. 3.
WITNESSES:
John C. Sanders
Albert F. Henman
INVENTOR
Ferdinand Koch
BY
ATTY.

UNITED STATES PATENT OFFICE.

FERDINAND KOCH, OF BERLIN, GERMANY.

WEIGHING-MACHINE.

1,033,420.  Specification of Letters Patent.  Patented July 23, 1912.

Application filed December 13, 1910.  Serial No. 597,157.

*To all whom it may concern:*

Be it known that I, FERDINAND KOCH, a subject of the German Emperor, and resident of Berlin, Germany, have invented certain new and useful Improvements in Weighing-Machines, of which the following is a specification.

This invention relates to improvements in weighing machines.

Under this invention the weighing machine is provided with a mirror or reflector for reflecting the dial and pointer mechanism of the machine in such manner that the weight indicated on the dial can be read from a point of view above the machine. The weighing machine may be used for weighing either persons, or luggage, or the like, and, when used for weighing persons, the person being weighed can read his, or her weight in the mirror from his, or her place when on the machine.

In order that my invention may be properly understood, I have hereunto appended an explanatory sheet of drawings, whereon a form of the invention is shown.

On the drawings:—Figure 1 is a side view of the weighing machine and Fig. 2 a front view of same. Fig. 3 illustrates a weighing machine being used for weighing persons.

Referring to the drawings:—the weighing machine is of the known kind having a footplate $a$ and a vertically movable foot-plate carrier $b$ which, under the influence of springs, or weight levers, or their equivalent, can, by means of suitable gearing, turn or revolve the pointer shaft $c$ whose pointer $d$ works on the face of the dial $e$. A mirror or reflector $f$ is adjustably secured or fitted to the weighing machine in any convenient manner such as, for instance, by hinges, and said mirror $f$, when in use, is capable of taking up an inclined position of about 45°.

In Fig. 1 the dial $e$ is shown in full lines in the open or operative position, and in dotted lines in the closed position. The mirror may be provided with screws or equivalent means for adjusting the position thereof. The dial $e$ of the weighing machine is provided with reversed figuring so that when the same is reflected in the mirror, or reflector, the figures appear in their proper positions and can be read by the party using the machine, as illustrated in Fig. 3.

Having now particularly described and ascertained the nature of my said invention and in what manner the same is to be performed, I declare that what I claim is:—

In a weighing machine, in combination, a standard, a vertically movable plate supported thereby and adapted to support the person to be weighed, a dial carried by said standard and provided with characters to designate the weight of the person, a pointer actuated by the movement of said plate for indicating upon said dial the weight of the person, a mirror positioned below said plate, said mirror being pivotally attached at its lower edge to the bottom of said standard, whereby it may be moved toward and away from said dial, said mirror being adapted to reflect the characters on the dial, whereby by moving the mirror to occupy a position away from said dial the person standing upon said plate may read his or her weight, the characters on the dial being arranged reversely, whereby the reflection of said characters will show the characters in their direct or normal position to the person being weighed.

In testimony whereof I affix my signature in presence of two witnesses.

FERDINAND KOCH.

Witnesses:
WOLDEMAR HAUPT,
HENRY HASPER.